Aug. 6, 1968

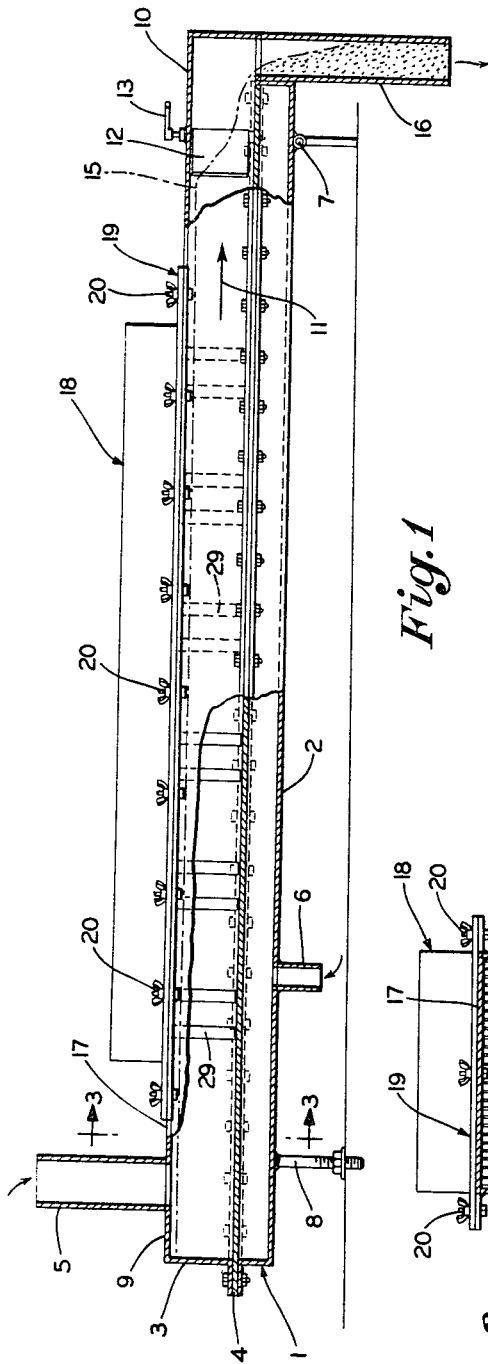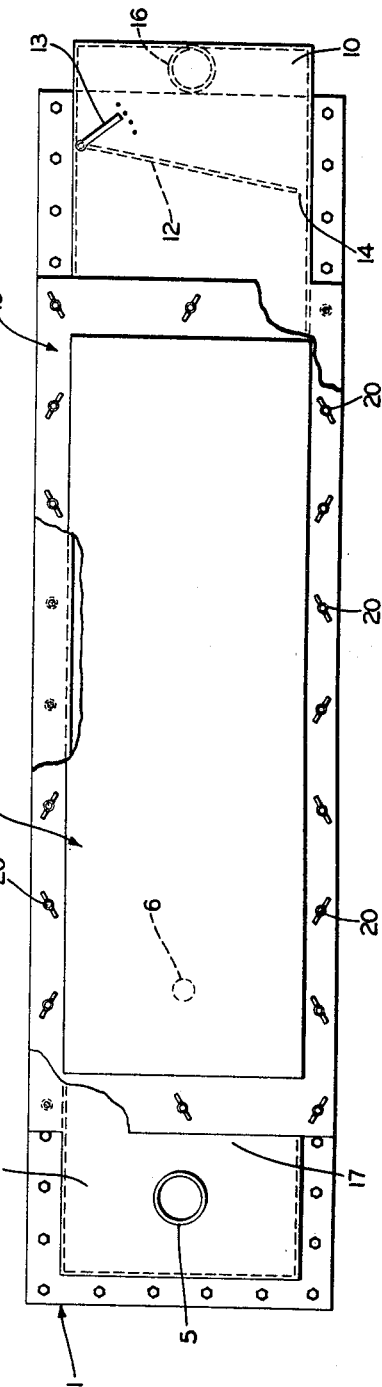

S. G. HAW 3,395,797

MAGNETIC SEPARATION METHOD AND CONSTRUCTION

Filed March 24, 1966

INVENTOR.
Sherwood G. Haw
BY
Frease & Bishop
ATTORNEYS 3,395,797
MAGNETIC SEPARATION METHOD
AND CONSTRUCTION
Sherwood G. Haw, North Canton, Ohio, assignor to The
Banister Corporation, Hubbard, Ohio, a corporation of
Minnesota
Filed Mar. 24, 1966, Ser. No. 537,089
11 Claims. (Cl. 209—214)

The invention relates to a method of and apparatus for separating magnetic particles from any finely divided substance, such as powdered plastic resin; and more particularly to a new procedure enabling free flow through a mass of finely divided material containing magnetic particles, of the magnetic particles to magnet means so as to obtain substantially complete separation.

In the manufacture of plastic coated articles, the coating material ordinarily used is a powdered plastic resin. Such resin in powdered form normally is prepared by usual grinding equipment, such as ball or hammer mills, which include metallic members. Although the plastic material, per se, being ground may be relatively free of metallic impurities, nevertheless metal particles may be picked up by the powdered plastic material from the mill during grinding.

It has been extremely difficult in the past by any known prior means or equipment to eliminate contaminating metal particles from powdered plastic resin to the degree necessary to provide powdered plastic material having such degree of purity that the material can be used to coat metal products effectively, efficiently and without producing imperfectly coated products.

The inability to obtain powdered plastic materials free of contaminating metallic particles with the degree of purity required to produce satisfactory plastic coatings has been an unsolved problem in the plastic coating industry for a long time. All known available magnetic separators intended to remove metallic impurities from finely divided powders operate on the principle of separating magnetic particles from bulk material. The use of this principle in processing powdered plastic resins and the like has been ineffective to remove metallic impurities from the powdered material to the degree necessary for satisfactory use in plastic coating procedures.

I have discovered that when powdered plastic resins containing metallic impurities are fluidized in a fluidized bed, followed by flowing the fluidized material closely adjacent to and past a multiplicity of magnet means having magnetized surfaces projecting into the fluidized bed and into the flowing fluidized material, and at the same time flowing the fluidized material through magnetic fields extending into said fluidized bed and established by said magnet means, substantially all of the metallic impurity content of the powdered plastic material is attracted to and deposits on the magnetized surfaces, thereby producing substantially completely pure powdered plastic material.

Accordingly, objects of the invention are to provide new procedures and equipment for magnetic separation of metallic impurities from powdered plastic materials or other similar finely divided substances so as to substantially completely eliminate metallic impurities from such powdered substances; to provide for eliminating insurmountable difficulties which heretofore have existed in the art of magnetic separation; and to obtain the indicated objectives in a simple, effective, and inexpensive manner, thereby satisfying existing needs.

These and other objects may be obtained, the stated results achieved, and the described difficulties overcome by the methods, steps, procedures, structures, devices, elements, arrangements, parts and combinations which comprise the present invention, the nature of which are set forth in the following general statements, a preferred embodiment of which—illustrative of the best mode in which applicant has contemplated applying the principles—is set forth in the following description and shown in the drawings, and which are particularly and distinctly pointed out and set forth in the appended claims.

One aspect of the invention involves forming a fluidized bed of comminuted metallic-impurity-containing plastic material, providing magnet means having magnetized surfaces extending within the fluidized bed, flowing the fluidized material past said surfaces and through magnetic fields in said fluidized bed formed by said magnet means, the fluidized plastic material in fluidized state permitting magnetic metallic particles in the plastic material to flow freely through the fluidized material by magnetic attraction to the magnetic surfaces and to deposit on said magnetic surfaces, removing the magnet means from the fluidized bed from time to time, and removing from the magnet means the magnetic particles deposited thereon.

Another aspect of the invention involves magnetic separation apparatus including a fluidized bed housing, means for introducing powdered material containing magnetic metallic particles into the housing, means for introducing air under pressure through diffuser means into the housing to form a fluidized bed of powdered material, a plurality of magnet means having a multiplicity of spaced magnetic finger means removably suspended within the fluidized bed in said housing, means for flowing fluidized material through the bed and past said fingers, and valve means maintaining the fluidized material in said bed at a level substantially completely filling the bed at all times as the fluidized material flows through the bed and past the fingers.

By way of example, the improved method and apparatus are diagrammatically illustrated in the accompanying drawings forming part hereof in which:

FIGURE 1 is a diagrammatic side elevation with parts broken away and in section of an improved magnetic separation unit;

FIG. 2 is a plan view of the unit shown in FIG. 1;

FIG. 3 is a section taken on the line 3—3, FIG. 1,

Similar numerals refer to similar parts throughout the various figures of the drawings.

Figure 4:
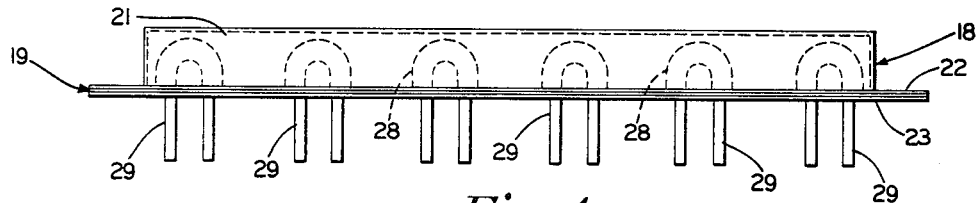
FIG. 4 is a side elevation of the magnet means unit used in FIG. 1 removed from the separator unit.

The fluidized bed unit housing 1 includes an elongated lower housing member 2, an upper housing member 3, and a typical fluidized bed diffuser mat 4 separating the lower and upper housing members 2 and 3. An inlet member 5 communicates with one end 9 of the upper housing member 3 for introducing powdered material containing metallic particle impurities to be separated from the material in the magnetic separation equipment.

Air under low pressure is introduced through inlet 6 into the lower housing 2 and this air diffuses through mat 4 into the upper fluidized bed housing 3 forming a fluidized bed of the powdered material introduced into housing 3.

Housing 1 preferably is mounted at one end on bearings 7 so that the other or inlet end 9 may be adjustably raised by jack means 8 sufficiently higher than the outlet end 10 of housing 1 that the fluidized material in the upper fluidized bed chamber 3 will flow in the chamber in the direction of the arrow 11.

When a fluidized bed of comminuted material is formed, the fluidized material flows in a manner similar to the flow of water. A gate valve 12 is provided at the outlet end 10 of the fluidized bed housing 3 adjustable through control 13 to provide an outlet opening 14 of desired size extending vertically of housing 1 along one side of the upper housing member 3 so as to act as a dam for the fluidized material flowing through the fluidized bed.

The vertically extending opening 14 at the edge of gate valve 12 by proper adjustment maintains the upper fluidized bed chamber 3 substantially full of fluidized material flowing therethrough. This is shown by the dot-dash line 15 in FIG. 1 indicating the level of the material in the bed chamber 3 and as it flows past gate valve 12 and into discharge pipe 16 for the comminuted material treated in the magnetic separation unit 1.

In accordance with the invention, an elongated opening is formed in the top wall 17 of housing member 3 which is covered by magnet unit generally indicated at 18 which is removably mounted on housing member 3 by flange means 19 bolted at 20 to upper housing member top wall 17.

Magnetic unit 18 preferably includes a rectangular cover member 21 terminating in an outturned flange 22 around the perimeter of the cover member. Side members 23 and end members 24 are assembled with cover flange 22, with suitable spacer members 25 interposed between the end members 24 and cover flange 22.

A series of strip-like pole plates 26 extend laterally of the cover member 21 and the ends of the pole plates 26 are assembled between the cover flange 22 and side members 23, thereby forming the flange means 19 of the magnet unit 18 described. A series of magnetic insulation gap plates 27, similarly assembly with their ends between the cover flange 22 and side members 23, are provided alternately between the pole plates 26. The gap plates 27 and other elements of the magnet unit 18 are suitably formed of nonmagnetic material.

A number of permanent magnets 28 are mounted on adjacent pairs of pole plates 26 within cover member 21. A series of spaced metal fin fingers 29 is mounted preferably in a row on each pole plate 26. The fin fingers 29 preferably are formed with a foot 30 and a finger portion 31 angled slightly. The fin feet 30 of fin fingers 29 are assembled to the pole plates 26 so that a series of fin fingers 31 projects downwardly from each pole plate 26 arranged laterally of the cover member 21. The fingers 31 are spaced apart and present a comb-like arrangement extending downwardly into the fluidized bed 3 when the magnet unit 18 is assembled with the housing unit 1 as shown in FIGS. 1 and 3.

Figure 5:
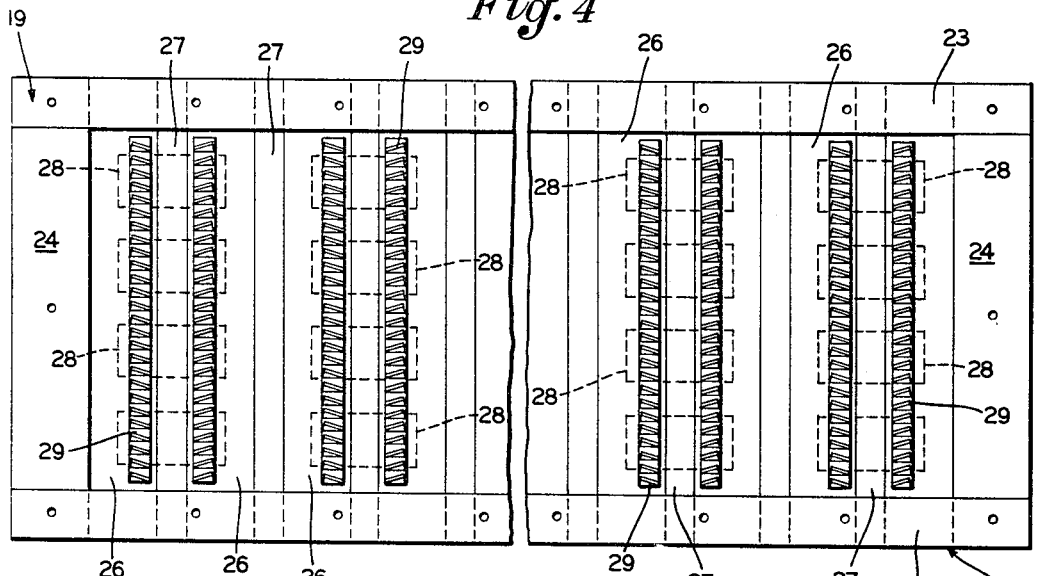
FIG. 5 is an enlarged fragmentary bottom plan view of the magnet means unit shown in FIG. 4.
Figures 6, 7:
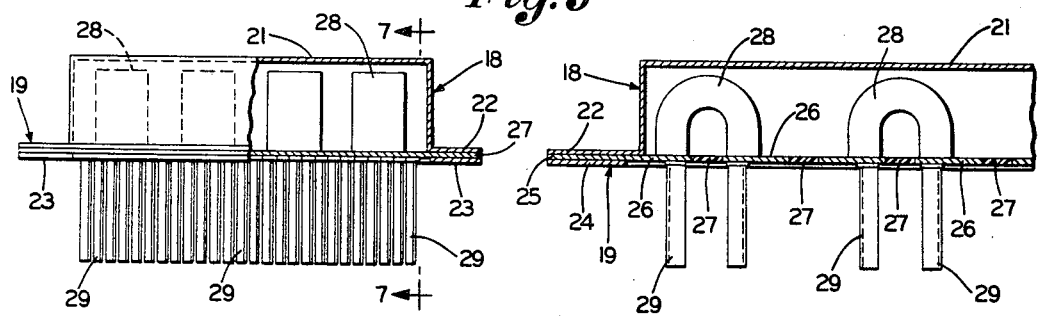
FIG. 6 is an end view with parts broken away of the unit shown in FIGS. 4 and 5.
FIG. 7 is a fragmentary sectional view looking in the direction of the arrows 7—7, FIG. 6.
Figure 8:
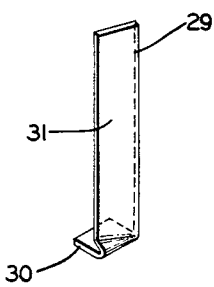
FIG. 8 is a detached perspective view of one of the magnetic fingers.

The fin fingers 29 connected with pole plates 26 are magnetized by the permanent magnets 28 also connected with each pair of pole plates. Thus, the fingers 31 present a multiplicity of magnetized surfaces extending into the fluidized bed. The comb-like arrangement of the fingers (FIGS. 3, 5, and 6) divide the fluidized material into a multiplicity of streams passing between adjacent fingers 31 as the fluidized material flows in the direction of the arrow 11 through the fluidized bed.

The multiplicity of magnetic fingers 31 suspended within the fluid bed provides a large magnetic surface area. The fluidized powder flowing through the fluidized bed, through the magnetic fields established by the magnetic fingers and past the magnetic finger surfaces in a multiplicity of streams enables the magnetic particles contained as impurities in the powdered material being treated to flow freely to the magnetic finger surfaces by magnetic attraction and to deposit and adhere to the magnetic fingers.

The powder with impurities suspended in a fluid state in the fluidized bed provides for reduced friction between the particles. The magnetic particles (impurities) are subjected to magnetic attraction forces and flow or move freely within the fluidized material streams to the surfaces of the magnetic fingers.

This ability of the contaminating magnetic particles to flow freely within the fluidized streams and migrate readily by magnetic attraction to the magnetized fingers, contrasts with the principles of conventional magnetic separation wherein the powders are passed through a magnetic field either by gravity or by some other means of conveyance in a bulk state. Under such bulk state conditions, friction between the particles is sufficiently greater than the magnetic forces, as to prevent small magnetic impurity particles from being separated from the powdered bulk.

In operation, impure powdered material such as powdered plastic material to be used in the plastic coating of metal articles is fed into inlet member 5 of housing 1. The fluidized bed is maintained in operation by introducing air under pressure through air inlet 6. The powdered or comminuted plastic material with impure metallic magnetic particles therein passes in fluidized streams through the bed in the direction of arrow 11 and past the magnetic fingers 31; and the flow of fluidized material is divided repeatedly into a multiplicity of streams as it flows through the bed. The magnetic particles in the powdered material deposit on the fingers and substantially pure powder free of contaminating magnetic particles is discharged from the unit through discharge pipe 16.

From time to time the magnetic unit 18 is removed and the magnetic particles adhering to the magnetic fingers 31 are removed preferably by blow-cleaning with compressed air.

The rate of flow of material being treated through unit 1 may be regulated by adjusting the inclination of the unit through adjustment of jack means 8. The bed is maintained full of fluidized material by adjustment of gate valve 12 and the flow opening 14 provided thereby.

Diffuser mat 4 may be formed in the usual manner for operation of a fluidized bed of any desired pourous material such as polyethylene, ceramic material, fiberboard, etc. Permanent magnets have been shown and described as included in the magnetic unit 18, but electromagnets may be used instead.

The improved construction and procedure has been used successfully to separate contaminating magnetic particles from powdered polyester and epoxy resins heretofore impossible to remove. Prior to the invention, it was impossible to obtain powdered polyester resins or powdered epoxy resins from material suppliers sufficiently free of magnetic article impurities to permit proper plastic coating procedures to be carried out. Furthermore, all known or available equipment attempted to be used for removing such magnetic impurities from the powdered plastic material failed to remove the impurities to the degree required.

An important aspect of the invention is the location of the magnetized fingers in the path of flow of fluidized material so that the fingers break up the flow in a multiplicity of streams and so that the fluidized material must move past magnetized surfaces during free flow of the comminuted material in fluidized state. Furthermore, maximum separation efficiency is obtained where the flow of the fluidized material past magnetized surfaces is generally horizontal in direction and shallow in depth, as shown.

The chamber formed by housing 3 in which the fluidized bed is located, as shown, and through which the comminuted material flows in fluidized state is relatively shallow in depth as compared to the length and width of the chamber. It has been discovered that this arrangement of shallow-depth, horizontal-flow of the fluidized material past magnetized surfaces results in maximum efficiency of separation of magnetic particles from comminuted material containing such particles as an impurity.

Accordingly, the present invention provides new procedures and equipment for the magnetic separation of metallic impurities from powdered plastic materials and the like and provides a solution to a problem longstanding in the art which achieves the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and of the new procedures and apparatus are by way of example, and the scope of the invention is not limited to the exact details shown or described because various modifications in the equipment may be made incorporating the fundamental concepts of the invention without departing from the principles set forth.

Having now described the features, discoveries and principles of the invention, the characteristics of the new equipment, the manner in which the new procedures may be carried out, and the advantageous, new and useful results obtained thereby, the new and useful methods, steps, procedures, structures, devices, elements, arrangements, parts, combinations, and discoveries, and mechanical equivalents obvious to those skilled in the art are set forth in the appended claims.

I claim:

1. The method of separating magnetic particles from comminuted magnetic-particle-impurity-containing material, including the steps of forming a bed of fluidized comminuted magnetic-particle-impurity-containing material on a fluid pervious surface, locating a multiplicity of magnetized surfaces in a path of flow of said fluidized material, flowing the fluidized material past said magnetized surfaces, the fluidized material in fluidized state releasing the magnetic particles to flow freely relative to the comminuted material containing said magnetic particles and to migrate by magnetic attraction to said magnetized surfaces past which the fluidized material flows, and depositing said magnetic particles on said magnetized surfaces by said magnetic attraction.

2. The method set forth in claim 1 in which the fluidized impurity-containing material is divided repeatedly into a multiplicity of streams as the fluidized material flows past said magnetized surfaces.

3. The method set forth in claim 1 in which the fluidizing of the comminuted impurity-containing material reduces interparticle friction between hte magnetic particle impurities and the comminuted material containing said magnetic particle impurities, thereby releasing the magnetic particle impurities for movement by magnetic attraction forces.

4. The method set forth in claim 1 in which the magnetized surfaces are removed from the fluidized material from time to time and adhering magnetic particles are removed from said magnetized surfaces.

5. The method set forth in claim 1 in which the fluidized material flows in a generally horizontal path in flowing past said magnetized surfaces.

6. Apparatus for magnetic separation of magnetic particles from comminuted magnetic-particle-impurity-containing material, including a fluidized bed housing, means for introducing comminuted magnetic-particle-impurity-containing material into the housing, means including diffuser means for introducing air under pressure into the housing to form a fluidized bed of said comminuted material, means locating a multiplicity of fingers having magnetized surfaces into the fluidized material, means for flowing said fluidized comminuted material through said housing and past said magnetized surfaces, and means for maintaining the bed of fluidized material in said housing in a state substantially completely filling the housing as the fluidized material flows through said housing and past said fingers.

7. The apparatus set forth in claim 6 in which the fingers having magnetized surfaces extending into the fluidized material are located in a series of rows each extending crosswise of the housing generally normal to the direction of flow of fluidized material through the housing, in which a plurality of fingers are located in each row, and in which adjacent fingers in any row are spaced from one another to divide the flowing fluidized material into a series of streams as it flows past the fingers in each row.

8. The apparatus set forth in claim 6 in which the means for flowing fluidized material through said housing includes adjustable means for tilting the housing to a desired angle from end to end relative to the horizontal whereby the fluidized material flows through the housing from one end to the other by gravity incident to the tilt, and whereby a change in the degree of tilt changes the rate of flow of fluidized material through the housing.

9. The apparatus set forth in claim 6 in which the means for maintaining the housing substantially completely filled with fluidized material comprises adjustable hinged gate valve means having a vertically extending swinging edge adapted to be moved toward and away from a vertical housing side wall.

10. The apparatus set forth in claim 6 in which each finger is suspended substantially vertically within the housing, and in which planes passing through the magnetized surfaces of the fingers are located angularly with respect to the direction of flow of the fluidized material through the housing.

11. The apparatus set forth in claim 6 in which the housing is elongated and extends generally in a horizontal direction, in which the means for flowing material through the housing includes means for tilting the housing slightly out of horizontal, and in which the fluidized bed of comminuted material formed in the housing is relatively shallow in depth as compared to the length and width of the housing to form a relatively shallow fluidized bed of comminuted material as it flows through the housing.

References Cited
UNITED STATES PATENTS

| | | | |
|---|---|---|---|
| 238,737 | 3/1881 | Wheeler | 209—223 |
| 258,710 | 5/1882 | Burnett | 209—223 |
| 410,876 | 9/1889 | Conkling | 209—232 |
| 3,006,472 | 10/1961 | Clute | 209—214 |

HARRY B. THORNTON, *Primary Examiner.*

TIM R. MILES, *Assistant Examiner.*